Sept. 1, 1925.

G. R. WATSON

DRILL BIT

Filed Sept. 5, 1924

1,551,717

Inventor,
G. R. Watson, by
G. C. Kennedy
Attorney.

Patented Sept. 1, 1925.

1,551,717

UNITED STATES PATENT OFFICE.

GEORGE R. WATSON, OF WATERLOO, IOWA, ASSIGNOR TO ARMSTRONG MANUFACTURING COMPANY, OF WATERLOO, IOWA.

DRILL BIT.

Application filed September 5, 1924. Serial No. 736,163.

*To all whom it may concern:*

Be it known that I, GEORGE R. WATSON, citizen of the United States, residing at Waterloo, in the county of Black Hawk and State of Iowa, have invented certain new and useful Improvements in Drill Bits, of which the following is a specification.

My invention relates to improvements in drill-bits, and the object of my improvement is to perfect the shape of the bit for drilling rock strata, particularly strata having a relative steep inclination, and to render the action of the bit efficient in reaming, cutting and crushing-dislodged material.

Figure 1:
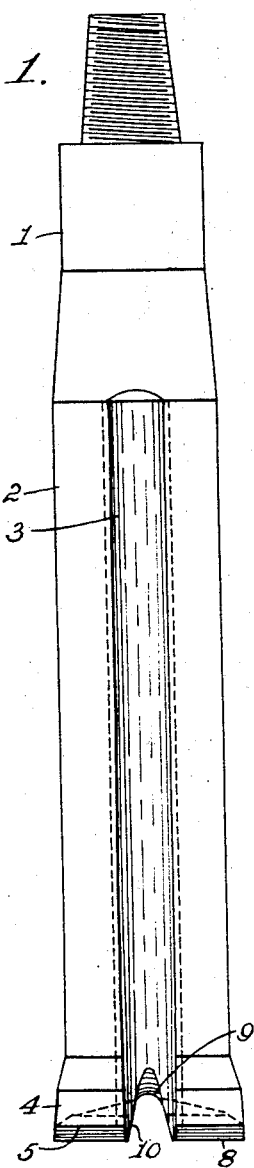
Figure 2:
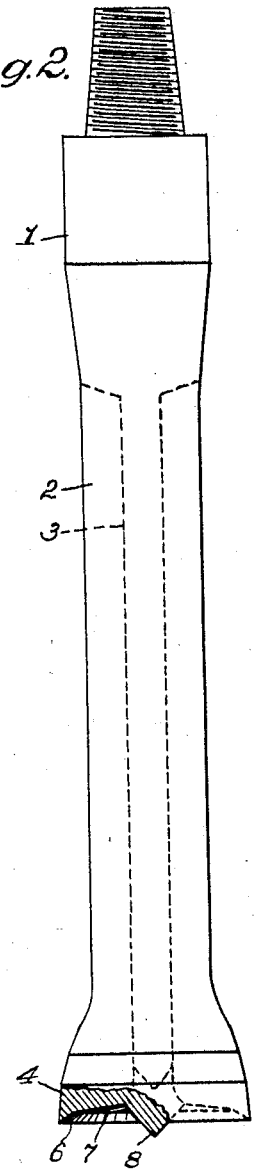
Figure 3:
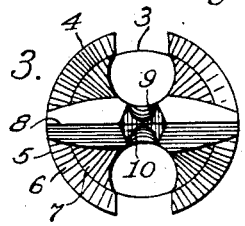

This object I have attained in the drill-bit which is hereinafter described and claimed, and which is illustrated in the accompanying drawing, in which Fig. 1 is a side elevation of the drill-bit of my invention, Fig. 2 is a side elevation thereof taken at an angle of ninety degrees from the elevation of said Fig. 1, and Fig. 3 is a plan of the end face of the bit.

This drill-bit has a shank 1 and body 2 supplied on opposite sides with longitudinal grooves 3 which terminate in the end face of the bit. The inner part of each groove is circular in cross section the opening of the groove outwardly being considerably narrower than the diameter of said inner part with the opposite walls of this opening parallel thus affording at the end face efficient cutting edges and angles. The lower openings of the grooves through said end face divide the end face into two opposite like regions, and the end face is hollowed concavely with two concentric zones 7 and 6 to the outer circumferential or arcuate reaming edges of the widened head part 4 of the drill.

The inner zone 7 is positioned at a greater angle to the axis of the drill than the outer zone 6. This provides a sufficiently sharp reaming angle or edge to the tool which can be easily dressed when necessary, while the inner zone buttresses the outer zone of the end face, adding sufficient strength thereto.

Said end face is shaped with a diametrical anticlinal cutter 8 whose opposite parts cross the said sets of zone parts 6 and 7 medially. The middle of the cutter 8 is hollowed out at 10 anticlinally with an edge 9 in line with the cutting edge of said cutter, and the lower ends of the longitudinal grooves 3 communicate with said hollow 10. The cutter angle 8 projects beyond the reamers 4—6.

The end zones 6 and 7 together provide crushing faces, for small fragments of rock cut away by either the reamers or said transverse cutter 8, the grooves 3 being water conduits for receiving or discharging water, the sides of the drill being spaced apart from the walls of the drill hole except at the location of the reamers 4—6.

It is important in drilling through non-homogeneous strata or tilted strata, to provide a drill-bit of the above description, where the circumferential lengths of the pair of reamers is the maximum possible, because in the varying degrees of hardness, or in case of cracks in the rock, or extreme tilting of the strata, any other shape of the reamers where they are of relatively small circumferential length, would find faults and unevenness which would be detrimental in the producing of a perfectly shaped drill-hole, such as is made by the above described longer reamers.

The reamers thus cooperate with the transverse diametrical cutter 8, while the latter is excavating the bottom of the drill-hole as the tool is lifted and then dropped, and while the tool rocks from side to side, in hastening the drilling work to effect the drilling in about one third of the time required by other bits of previous design.

Having described my invention, what I claim as new, and desire to secure by Letters Patent, is:

1. A drill-bit having opposite arcuate reaming cutters the end face of the bit sloping relatively steeply to the cutters for a distance inwardly with the inner part of the end face sloping at a less angle relative to the cutters to buttress and support said outer parts.

2. A drill-bit having opposite arcuate reaming cutters whose ends are spaced relatively narrowly apart, the end face of the bit being sloped from said reaming cutters toward the axis at different inclinations to afford small angle cutters with an inner abutment, said end parts together providing crushing faces, and a transverse cutter projecting from said end face across both reaming cutters.

3. A drill-bit having oppositely positioned reaming cutters, the end face of the bit being hollowed to provide a crushing means, and said end face having an anticlinal cutter across said reaming cutters and projecting therefrom with its middle part notched synclinally, the bit having longitudinal grooves on opposite sides which open into opposite parts of said notch.

4. A drill-bit having cutters on its end face, and having longitudinal grooves on its opposite sides with their lower ends opening through the end face, the inner parts of the grooves being wider than the outer parts.

In testimony whereof I affix my signature.

Waterloo, Iowa, Aug. 5, 1924.

GEORGE R. WATSON.